United States Patent [19]

Englund et al.

[11] 4,032,492

[45] July 5, 1977

[54] HOT MELT CONTAINER CLOSURE SEALANT

[75] Inventors: Paul A. Englund, St. Paul; James A. Collins, North Oaks, both of Minn.

[73] Assignee: H. B. Fuller Company, St. Paul, Minn.

[22] Filed: Feb. 25, 1976

[21] Appl. No.: 661,269

[52] U.S. Cl. .......................... 260/28.5 A; 215/233; 427/385 B

[51] Int. Cl.$^2$ ......................................... C08L 91/00

[58] Field of Search ................. 260/28.5 A, 28.5 B

[56] References Cited

UNITED STATES PATENTS

| | | | |
|---|---|---|---|
| 3,772,234 | 11/1973 | Porter | 260/28.5 A |
| 3,917,607 | 11/1975 | Crossland et al. | 260/880 B |
| 3,931,081 | 1/1976 | Dany et al. | 260/28.5 A |

Primary Examiner—Melvin I. Marquis
Attorney, Agent, or Firm—Norman P. Friederichs

[57] ABSTRACT

A hot melt composition is used to form a closure liner, e.g. the circular, integral, gasket-like member adhered to the periphery of a circular top or closure for a food jar or the like. The hot melt composition is selected to have, in the solid state, sufficient deformabilty, resiliency, hardness, lubricity, and other requirements of closure liners. It has been found that silicone oil, used in a concentration of about 1-8% by weight of the total hot melt composition can provide a high degree of lubricity, similar to the type of lubricity in self-lubricated plastic bearings. The remainder of the hot melt system or composition generally comprises a rubbery block co-polymer (serving as a film former), a hydrocarbon wax, a hydrocarbon oil, and, if desired, a thermoplastic vinyl arene polymer such as poly(methylstyrene). To apply the hot melt composition to the closure, the hot melt is poured on in a molten or flowable state, and this flowable state is maintained, so that the resulting deposit of hot melt composition seeks its own level under the influence of gravity.

5 Claims, No Drawings

HOT MELT CONTAINER CLOSURE SEALANT

FIELD OF THE INVENTION

This invention relates to so-called hot melt compositions of the type containing one or more film-forming polymers and a wax. An aspect of this invention relates to a method for applying a hot melt composition to a closure member or closure device, whereby the closure is provided with a liner or sealing member. Another aspect of this invention relates to the resulting closures and closed or sealed containers comprising the closures.

DESCRIPTION OF THE PRIOR ART

There are many situations in which the closure for a container must be capable of providing a liquid-tight and/or gas-tight seal, so that there will be a minimum of exchange of gases and/or liquids between the contents of the container and the surrounding environment. Accordingly, various means have been developed for providing closures with sealing members or liners having "microseal" and "macroseal" characteristics for sealing the container's orifice. A "microseal" capability relates to an essentially physico-chemical barrier to the passage of sub-microscopic particles such as gas molecules. (Liquid products and moisture- or oxygen-sensitive products within the container — which includes some solid products — may have to be sealed off from air and moisture; conversely, liquid products such as solvents with high vapor pressures may have to be sealed off from the environment.) Conventionally, microsealing action is provided by a dense, relatively rigid barrier material.

A macroseal (physical seal) capability is also required for most containers, since a perfect engagement of the surface of the container's orifice with that of the liner is ordinarily a practical impossibility. In fact, irregularities in either surface large enough to allow passage of liquids as well as gases are common. A conventional technique for dealing with the macroseal requirement is to provide a liner resilient enough to fill the irregularities. When both a macroseal and a microseal are required, a composite liner comprising a resilient backing and a barrier-type facing is often used. Liners which are not composites, but consist of essentially one material are sometimes referred to as being of the "homogeneous" type.

Both types of liners (i.e. homogeneous and composite) are highly developed, both as to structure and materials. The earliest closure liners were generally made from rubber and/or cork, but increasing demands for better sealing action led to the development of backings, facings, coatings, and homogeneous systems comprising a much wider variety of materials including pulpboard, newsboard, reconstituted or composition cork (ground cork combined with a binder), waxed paper, plastic foams, and various other plastic materials such as polystyrene, polyvinyl chloride (typically employed as plastisols or organosols), polypropylene, polyethylene, polyesters such as polyethylene terephthalate, ethylene-vinyl acetate, alone or in combination with coatings of materials such as casein, urea or melamine resins, and polyvinylidine chloride.

Structurally speaking, it is particularly convenient when the sealing member or liner is integral with the closure. Typically, the liner is in adherent contact with one or more internal surfaces of the closure — "internal" surfaces being those which face toward the interior of the container or which engage a protruding orifice-defining portion of the container. Thus, the liner can be adhered to a planar surface of the closure, which planar surface serves as the underside or container-engaging, orifice-covering portion of the closure; alternatively, the liner can be adhered to a flange or skirt or interior cylindrical surface of a closure which is either clamped or crimped into place or threadedly engaged upon a threaded neck or opening of the container. In some of these structures, it is sufficient to provide a peripheral sealing member which is, in effect, a gasketlike means integral with the closure. For example, the liner may cover only a peripheral flange or skirt or inner cylindrical surface of the closure. More typically, as in the case of the typical screw-top lid for a food jar, the gasket-like liner covers only that peripheral portion of the planar undersurface of the lid which engages the top surface of the container orifice. In the case of beverage bottle closures (e.g. bottle caps), the liner covers the entire undersurface. Still another application of closure liners involves providing a peripheral seal around a removable tab or die-cut removable portion of a closure lid.

As will be apparent from the foregoing description, both the function and the requirements of a liner can be complex, and the properties for liner-forming materials must be stated in somewhat general terms. Several factors must be considered in arriving at generalizations regarding the requirements of a liner material. For example, the requirements for essentially single use closures (e.g. the type of beverage bottle caps which are crimped in place) can be somewhat less demanding than in the case of closures which are repeatedly removed and replaced, as in the case of peanut butter jars. Requirements for packaging solids which are not moisture- or oxygen-sensitive or intended for human consumption can be less difficult than requirements encountered in the case of food or pharmaceutical packaging. Special requirements are frequently encountered in the case of containers for chemicals (solvents, reagents, etc.), oils and greases, aqueous systems, and the like.

Thus, in order to meet all or most of the special requirements for packaging foods, pharmaceuticals, and various liquids with high volatility, solvent characteristics, and the like, the ideal liner material would have several diverse properties, some of which would at least appear to be mutually contradictory. For example, it would generally be desirable if the material can be made to adhere to various metals and plastics, can be applied or formed in place or adhered without the use of solvents, would be effective as homogeneous systems (as opposed to facing/backing composites), would have resistance to attack by various chemicals, would have low gas permeability and water vapor transmission characteristics along with good macroseal characteristics, would be deformable and resilient (generally low in compression set) and yet retain adequate strength and hardness characteristics (including abrasion resistane in the case of closures intended for re-use), and would be generally lubricitous, i.e. low in frictional resistance to the sliding of the liner over the top surface of the orifice. If a liner tended to have frictional resistance to turning of the closure (as in the case of screw-top lids), the result would be a phenomenon sometimes referred to as "chatter", wherein continuous, smooth turning of the screw cap is difficult or impossible.

For a thorough discussion of closure liners, see the article by Brian Crawford in *Package Engineering*, June, 1975, pages 42–44.

SUMMARY OF THE INVENTION

It has now been found that a hot melt composition can be used to form closure liners. Apparently, closure manufacturers do not typically use hot melt materials for this purpose. It is believed that there are several reasons for the reluctance to employ or even investigate hot melt materials for applications such as the gasket-like liner of a screw-top lid. For example it is difficult to provide a hot melt composition which, in the solid state, has sufficient deformability, resiliency, hardness, and lubricity for such applications. Attainment of one, two, or more of these properties may be well within the skill of the hot melt chemist, but the attainment of all of the properties desired for a closure liner presents an extremely difficult problem of hot melt formulation. Furthermore, even if all of the components for a suitable hot melt composition can be combined in the molten phase, it must be anticipated that phase relationships will change in various ways during cooling, and such phase changes are difficult to predict with certainty, except in the case of the most time-honored and frequently used hot melt compositions (e.g. the wax/ethylene-vinyl acetate type). One phenomenon which is particularly difficult to predict is the retention or elimination of surface tack in the solidified hot melt.

A significant aspect of the present invention is the discovery that silicone oil, used in a concentration of about 1–8% by weight of the total hot melt composition can not only counter surface tack but can also provide a high degree of lubricity, similar to the type of lubricity in self-lubricated plastic bearings. (The liner of a closure can be considered to be, in essence, a bearing surface.) The remainder of the hot melt system generally comprises a rubbery block co-polymer (serving as a film-former), a hydrocarbon wax (to provide rigidity or crystallinity in the solid state and to provide viscosity control in the molten state), a hydrocarbon oil (which is believed to plasticize the rubber block co-polymer), and, if desired, a thermoplastic vinyl arene polymer such as poly(methylstyrene). There is believed to be a complex phase relationship between the silicone oil and the other phases of the hot melt composition, such that partial incompatibility of some sort may occur when the apparently homogeneous molten hot melt is cooled down to the solid state. There is believed to be a complex compatibility relationship in the case of the vinyl arene polymer also.

The method of this invention involves applying the hot melt composition in a flowable state to a surface of the closure, restoring or maintaining this flowable state such that the resulting deposit of hot melt composition seeks its own level under the influence of gravity, and, if necessary, cooling the resulting lined closure, so that it can be placed on a stack of closures immediately after the hot melt liner has leveled off under the influence of gravity. A closure and closure/liner combination can be any of the general types known to the prior art, though homogeneous liners are preferred over composite liners. Containers sealed with closures made according to this invention can be sufficiently gas tight for a variety of applications.

DETAILED DESCRIPTION

For a clear understanding of the structural aspects of closures and closure liners, reference is herein made to the illustrations on pages 42 and 43 of the previously cited article by Crawford in *Package Engineering*. These illustrations show typical screw-top caps or lids having a cylindrical peripheral liner for engaging the threaded top or neck of a container, which threaded top or neck defines the orifice means for filling and removing the contents of the container. The planar cover portion of the threaded closure engages the top surface of the orifice along its periphery. Accordingly, the gasket-like sealing member or liner is adhered to this peripheral portion of the container-engaging planar surface. (The container-engaging surface is the underside of the closure, when the closure is threaded into place.) In this invention, the gasket-like material comprises a hot melt composition which adheres to this planar surface of the closure in the molten state, forming an extremely strong adhesive bond. Upon cooling to room temperature, however, the exposed, container-engaging surface of the hot melt closure liner or sealing member is tack free and lubricitous. Accordingly, the threaded closure can be removed from and replaced in its container-engaging position many times without chatter and without damage to the liner itself. Furthermore, the hot melt has excellent adherence to a wide variety of closure materials, including metal and plastics.

The term "hot melt" or "hot melt composition" is generally understood to refer to a composition which changes to a mobile liquid capable of flowing under its own weight at moderately elevated temperatures, e.g. above 65° and below 320° C. (more typically below 250° C.) Hot melt materials and compositions of various melt indicies are well known in the plastics and adhesives arts and are generally used as coating and bonding materials. A typical hot melt composition comprises one or more high molecular weight polymers to impart strength and flexibility and/or film-forming characteristics to the composition; lower molecular weight resins, oils, and plasticizers which act as viscosity depressants or stabilizers or flexibilizers; and waxes, which serve several functions including control of the viscosity in the molten state, reduction of tack in the solid state, and increasing of rigidity or crystallinity in the solid state. Since a hot melt adhesive should have strong adhesive bonding characteristics in the molten state, so-called tackifier resins are often included in these adhesives, and the amount of tack-reducing materials is carefully balanced against the need for tack in the molten state. It is believed that one of the surprising discoveries to this invention is that a hot melt composition can be formulated to have excellent adherence to a variety of substrates and yet contain more than 2% by weight of silicone oil — a compound with strong lubricating characteristics. (For example, silicones are sometimes used as surface coatings for release liners.)

The hot melt compositions of the present invention include a rubber block co-polymer as the film-forming thermoplastic resin, a hydrocarbon oil as a plasticizer for the rubbery block co-polymer and/or as a viscosity control agent for the composition in the molten state, a hydrocarbon (preferably paraffin) wax as the wax component, and the silcone oil to provide lubricity when the hot melt has cooled to the solid state. As noted previously, it is preferred to include the vinyl arene polymer, e.g. a poly(methylstyrene). This vinyl arene polymer serves a variety of functions, some of which would appear to be mutually exclusive. For example, the polymer can improve adhesion of the hot melt composition to the closure when the composition is in the molten state, but due to a complicated compatibility or phase relationship which is not presently understood, the polymer reduces surface tack when the hot melt cools to the solid state.

The various components of the preferred hot melt compositions will now be described in greater detail.

THE RUBBERY BLOCK CO-POLYMER

Generally speaking, the basic types of rubbery or elastomeric block co-polymers particularly well-suited for use in this invention have an A-B-A structure; that is, the polymers contain at least one unit having a central B block linked to an A terminal block on each side of the center block. Each A block comprises repeating vinyl arene units and the B block comprises a rubbery ethylene-butylene polymer. The block co-polymer can contain a single A-B-A unit, whereby it consists of only three blocks, which can be represented as follows:

poly(vinyl arene) - poly(ethylene-butylene) - poly(vinylarene).

The term "vinyl arene" refers to compounds of the generic formula $HRC=CH_2$, wherein R is an aromatic radical such as phenyl (including tolyl and the like). Thus, the typical vinyl arenes are styrenes, including methylstyrenes such as alpha-methylstyrene, vinyl toluene, and the like.

A three block A-B-A co-polymer particularly preferred for use in this invention has the structure (polystyrene-poly(ethylene-butylene)-polystyrene-poly(ethylene-butylene)-polystyrene and is commercially available from Shell Chemical Company under the trademark "KRATON" G rubber G-1650 or G-1652. This block co-polymer is a two-phase thermoplastic material consisting essentially of polystyrene domains in a rubber matrix provided by the rubbery polyolefin midblock. The co-polymer is stable for extended periods at 350°–400° F., and this high level of stability is believed to result from the relative chemical stability of the polyolefin midblock. The co-polymer is known to be soluble in a variety of solvents and to be suitable for combination with a variety of tackifying resins, waxes, extending oils, solvents, and the like; see U.S. Pat. No. 3,917,607 (Crossland et al), issued Nov. 4, 1975.

To be useful in this invention, the A-B-A block co-polymer need not be limited to a single A-B-A unit. The essential characteristics of the so-called A-B-A structure are the relatively central location of the rubbery B blocks and the terminal location of the polystyrene A blocks. Thus, another type of block co-polymer useful in this invention is a teleblock copolymer comprising molecules having at least three branches radially branching out from a central hub, each said branch having polystyrene terminal blocks and a rubbery butadiene segment in the center. A commercially available version of this radial teleblock co-polymer is "SOLPRENE" 502, a trademark of Phillips Petroleum Company. Typical properties of "SOLPRENE" (trademark) 502-CX are as follows:

specific gravity: 0.91
melt flow, 190° C./21.6 Kg: 0.2
molecular weight: 91,000
Shore A hardness: 79
butadiene/styrene ratio: 70/30
tensile strength, psi: 3,900
modulus at 300% extension, psi: 540
elongation at break: 590%
compression set (method B) 22 hours, 78° F.: 35%

Thus, the A-B-A co-polymers used in this invention are true elastomers (according to the ASTM definition of "elastomer") and have an elongation at break well in excess of 200%, e.g. 500% or more. The ultimate tensile strength of these A-B-A co-polymers is moderately high, e.g. above 2,000 psi, more typically above 3,000 psi. Tensile strengths above 5,000 psi are possible with the A-B-A structure. Rubberiness in the A-B-A structure is generally provided by having a larger number of ethylene-propylene or butadiene unit than sytrene units.

The Essentially Hydrocarbon Oil

The oily liquids used in compounding hot melt compositions of this invention are essentially hydrocarbon process oils which are preferably low in aromatic content. For example, an analysis of the types of carbon atoms in oils used in this invention indicate that aromatic carbons comprise less than 5% of the oil, while naphthenic carbons (i.e. carbons of cycloaliphatic compounds and the like) can range from about 25 to 60% and paraffinic carbons can range from about 35 to 75%. Accordingly, these oils are typically referred to as "naphthenic" or paraffinic process oils.

These oils are preferably very low in volatility. Initial boiling points, under normal ambient pressure conditions, can range from well over 400° F. (i.e. above about 200° C). to almost 800° F. (almost 430° C.). The least volatile fraction in the process oils can have a boiling point in excess of about 1,000° F. (about 535° C.), so that the entire boiling range can cover several hundred degrees, e.g. 600°–1,100° F.. (315°–600° C.).

The aromatic content of the oils as determined by clay gel analysis (in weight percent) can range from less than 1% up to 15% or more; however, aromatic content should be low and should not exceed about 20% by weight, more preferably not more than 5% by weight. The molecular weight of the oil is typically above 200 and can be above 600. Most naphthenic and paraffinic process oils, however, tend to have a molecular weight within the range of 250-600.

The Hydrocarbon Wax

Although waxes are used in hot melt compositions more for their physical properties than for their chemical characteristics, all waxes do not work with equal effectiveness, and "mineral" or hydrocarbon waxes are preferred over ester waxes, amide waxes, etc. Of the various hydrocarbon waxes, it is most preferred to use petroleum waxes such as paraffin waxes containing hydrocarbon in roughly the $C_{18}$ to $C_{43}$ range, more typically the $C_{18}$-$C_{33}$ range of carbon content. Paraffin waxes typically solidify at temperatures within the range of about 27° to about 75° C. (about 80° to about 165° F.). Optimum results are obtained with relatively high melting paraffin waxes such as "SUNWAX" 5512, which melts at up to about 155° F. ("SUNWAX" is a trademark of the Sun Oil Company). This wax is presently preferred for its ability to blend with other components of the composition (e.g. the A-B-A block co-polymer).

The Silicone

An essential feature of the hot melts of this invention is the tendency to be somewhat self-lubricating (lubricitous) in the solid state. This self-lubricating property is provided by the silicone, which is preferably low enough in molecular weight to be a liquid. The preferred type of silicone is dimethyl polysiloxane, sometimes referred to as poly(dimethylsiloxane). Liquid silicones or silicone oils have been used for many years as anti-foaming agents of low toxicity. For this utility, the liquid silicones are effective in extremely small amounts, typically less than 1,000 parts per million (0.1%). In the present invention, however, amounts one or two orders of magnitude larger (e.g. 1–8%, preferably 3–8%) are generally needed for good lubricity of the hot melt liner.

A particularly preferred silicone is Dow Corning's "ANTIFOAM A", which has a consistency somewhat similar to honey and is essentially 100% silicone. It is tasteless, has only a slight odor, and is translucent or light gray in appearance. It is used widely in both general industrial applications and is food processing operations and, in non-standardized foods, it is permissible in amounts up to ten parts per million.

Thermoplastic Vinyl Arene Polymers

It is greatly preferred to include up to about 30% by weight of a thermoplastic hydrocarbon vinyl arene resin in hot melt compositions of this invention. The preferred resins are derived from substantially pure vinyl arene monomers, e.g. styrene-type monomers such as methylstyrene. Copolymerization of two or more vinyl arenes (e.g. vinyl toluene and alpha-methylstyrene) also produces resins useful in this invention.

The preferred vinyl arene resins have a molecular weight ranging from about 500 to 10,000 (e.g. 800–5,000), are resistant to water, oil, and chemicals, and are aggressively tacky at elevated temperatures (e.g. above 65° C.). However, in hot melt compositions of this invention, these resins appear to actually reduce surface tack upon cooling of the hot melt to normal ambient temperatures. Although this invention is not bound by any theory, it is believed that the vinyl arene resins tend to become partially incompatible upon solidification of the resin, and this tends to reduce rather than enhance the tack. This tack reduction phenomenon is desirable in the context of this invention, particularly in the case of liners for re-useable closures.

The preferred commercial embodiments of the vinyl arene polymers are the "PICCOTEX" and "PICCOLASTIC" resins (both trademarks of Hercules, Inc. of Wilmington, Delaware). "PICCOTEX" resins, which are vinyl toluene/alpha-methylstyrene co-polymers, can have a ring and ball softening point ranging from 73° to 120° C. and a melt viscosity less than 10,000 centipoise (cps) at 160° C. "PICCOLASTIC" resins, which are derived from pure styrene monomer, can have a ring and ball softening point ranging from 73° to about 150° C. and a melt viscosity below 10,000 cps at 250° C.

Other Ingredients

As is known in the art, other ingredients such as pigments, additional film-formers, and the like can be added to the composition. It is preferred that such other ingredients be employed in minor amounts, particularly as compared to the wax/block co-polymer/oil combinations described previously.

The Hot Melt Compositions

Preferred hot melt compositions of this invention have outstanding hardness (e.g. durometer [Shore A-2] readings in excess of 40) and softening points in the 85°–150° C. range, more typically above 105° C. (e.g. 110° C.) and below about 125° C. Drop melt points are typically at least 5° C. above the softening point and can be as much as 20 or more Centigrade degrees higher. However, the melt points are typically below 150° C. Melt viscosities can range from about 1,000 or less to 100,000 cps throughout the range of 100°–320° C., depending on the temperature and the ratios of components in the composition. For application of liner material to closures, efficient flow of hot melt composition can be obtained with melt temperatures above 120° C., but without exceeding 275° C.

Preferred hot melt formulas are given in the following table.

| Component | Amount in % by Weight | | |
| --- | --- | --- | --- |
| | Broad | Preferred | Optimum |
| Rubbery Block Co-polymer | 5–35 | 10–32 | 10–32 |
| Hydrocarbon Oil | 20–55 | 25–45 | 40–45 |
| Wax | 10–45 | 15–40 | 18–20 |
| Liquid Silicone | ≧1 | 3–8 | 4–5 |
| Vinyl Arene Resin | 0–30 | 5–30 | 10–25 |

The Method

In the context of this invention, it is preferred to arrange for a hot melt application method which will lend itself to continuous production and automation (including, where possible, conventional automated equipment) and which will maintain (i.e. hold or restore) the molten state of the hot melt after application to the closure. The purpose of the heat maintenance feature is to permit the freshly deposited liner to seek its own level under the influence of gravity. After the hot melt deposit on the closure has levelled off sufficiently, intentional cooling of the closure will facilitate rapid stacking of the product. Alternatively, the product can cool to room temperature spontaneously. Some closures (e.g. metal lids for food jars) cool very rapidly due to a heat sink effect provided by the mass of the closure itself.

For rapid production of lined closures, it is preferred to provide a hot melt reservoir at an applicator station. The entire reservoir can be held at a temperature above the melt point of softening point of the hot melt; alternatively, the hot melt can be fed to a heated dispensing device or the like. In either event, a heated zone is provided for maintaining the hot melt composition in a flowable state well above its softening point. The closures can be conveyed to the hot melt applicator station by standard techniques. To apply a peripheral, gasket-like liner to the closure, the closure can be rotated under a hot melt-dispensing nozzle. If the hot melt is maintained at a temperature high enough to depress the viscosity below 100,000 cps (e.g. 60,000 cps or less), the hot melt can simply flow through the nozzle onto the closure. During this application step, the closure is typically located in a horizontal position with at least one container-engaging surface facing upward. For example, in the case of a metallic screw top or threaded lid for food jars or the like, the planar surface which covers the orifice of the jar will be facing upward.

If the freshly lined closure can simply be held at the hot melt temperature, this should be done while the closure is held at a level attitude, thereby levelling the exposed upper surface of the hot melt liner through gravity flow action. More typically, the closure — being a heat sink — causes the freshly poured liner to snap cool and solidify, and a re-melt step is required to achieve the gravity flow. For example, a hot member can be brought into contact with a metal closure, thereby supplying almost instant heat to the liner and re-melting it.

In the following non-limiting Examples, all parts and percentages are by weight unless otherwise indicated.

EXAMPLE 1

In this Example, the following materials are identified both generically and by trade designation or trademark. "KRATON" is a trademark of the Shell Chemical Company for a variety of A-B-A rubbery block co-polymers. As mentioned previously, the preferred "KRATON" co-polymers used in this invention are specifically identified as "KRATON" G rubber G-1650 and G-1652. The G-1652 is similar to the G-1650 but is slightly lower in viscosity when in a flowable state. The mark "TUFFLO" is used to identify hydrocarbon process oils which are relatively low in aromatic content and relatively high in naphthenic and paraffinic content. The preferred "TUFFLO" oil used in this Example is "TUFFLO" 6204, which has a molecular weight of 440, an aromatic content of 14.8% (by clay gel analysis) or 2% (by carbon type analysis) and a saturated hydrocarbon content of 85.2% (by clay gel analysis). By carbon type analysis, the saturated hydrocarbon content works out to 52% naphthenic carbons and 46% paraffinic carbons. The distillation range of "TUFFLO" 6204 is 630°–1018° F., 50% of the oil being distilled at 896° F. The wax used in these Examples is "SUNWAX" 5512, a trademark of Sun Oil Company for a paraffin wax having a melting point of up to 155° F. The trademark "ANTIFOAM A" refers to Dow Corning's liquid silicone which is chemically poly(dimethylsiloxane). The mark "PICCOTEX", a trademark of Hercules Corporation, refers to thermoplastic resins produced by copolymerization of vinyltoluene and alpha-methylstyrene monomers. In this Example, the specific resin used is "PICCOTEX" 100, which has an R & B softening point of 96°–100° C., a maximum acid number of 1, a density at 25° C. of 1.04 Kg/liter, a flash point (COC) of 285° C., and the following melt viscosity: 1 poise at 195° C.; 10 poises at 155° C.; and 100 poises at 130° C.. The bromine number of this resin is 2 and the iodine number is 23.

The following composition was formulated by blending the ingredients together at a temperature above the melting point of the resulting hot melt composition:

| Ingredient | Amount in % by Weight |
| --- | --- |
| Rubbery Block Co-polymer ("KRATON" G-1650) | 10 |
| Hydrocarbon Oil ("TUFFLO" 6204) | 40 |
| Wax ("SUNWAX" 5512) | 20 |
| Liquid silicone ("ANTIFOAM A") | 5 |
| Hydrocarbon Resin ("PICCOTEX" 100) | 25 |

The foregoing composition was homogeneous in the molten state. It was dispensed from a hot melt applicator station onto metal lids for peanut butter jars. The hot melt composition solidified almost immediately upon being applied around the periphery of the inside surface of the jar lid. (The application of hot melt was made with the jar lid in the inverted position, i.e. with the container-engaging skirt facing upward.) Heat was then applied to the jar lid to reliquify the hot melt, causing it to seek its own level under the influence of gravity and form a generally smooth, gasket-like ring around the periphery of the inside surface of the lid.

EXAMPLES 2–5

The procedures and ingredients for these Examples were generally the same as in Example 1, except that no PICCOTEX was used. In Example 5, PICCOLASTIC resin was substituted for the PICCOTEX. PICCOLASTIC is a trademark of Hercules, Inc. for intermediate molecular weight (800–5,000) thermoplastic hydrocarbon resins derived from essentially pure styrene monomer. The particular polystyrene resin selected for Example 5 was PICCOLASTIC D-150, a trademark for a resin with an R & B softening point within the range of 143°–149° C. (e.g. 146° C), a density at 25° C. of 1.05 Kg/liter, a flash point (COC) of 288° C. and a melt viscosity of 100 poises at 245° C. The acid number of this resin is less than 1, and the bromine number is 1.5.

The Example 2–5 formulations are set forth below.

| | Amount in % by Weight | | | |
| --- | --- | --- | --- | --- |
| Ingredient | Ex. 2 | Ex. 3 | Ex. 4 | Ex. 5 |
| Rubbery Block Co-polymer ("KRATON" G-1650) | 32 | 32 | 32 | 25 |
| Hydrocarbon Oil ("TUFFLO" 6204) | 24 | 49 | 45 | 40 |
| Wax ("SUNWAX" 5512) | 40 | 15 | 18 | 20 |
| Liquid Silicone ("ANTIFOAM A") | 4 | 4 | 5 | 5 |
| Hydrocarbon Resin ("PICCOLASTIC" D-150) | — | — | — | 10 |

Of Examples 2–5, Example 5 is preferred. The Example 5 formulation was found to have the following properties.

R & B softening point: 250° F.
drop melt point: 262° F.
viscosity (in centipoise) at:
350° F. — 10,000
375° F. — 4,375
400° F. — 2,500

The R & B softening point and drop melt point for the formulation of Example 4 were 230° and 270° F., respectively. The Example 4 formulation was thus very close to the Example 1 formulation regarding these softening and melting properties. The melt viscosity of the Example 4 formulaton was relatively high (7,500 cps at 400° F.) compared to Example 5.

What is claimed is:
1. A hot melt composition comprising an intimate admixture of the following components:
 a. 15–45% by weight of a hydrocarbon wax;
 b. 5–35% by weight of a rubbery block co-polymer said block co-polymer comprising at least one A-B-A unit, the A blocks of said A-B-A unit comprising repeating vinyl arene units and the B block comprising a rubbery ethylene-butylene or butadiene polymer;
c. 20-45% by weight of an essentially hydrocarbon oil;
d. 1-8% by weight of a liquid silicone which is essentially non-toxic; and
e. up to 30% by weight of a resinous thermoplastic polymer containing vinyl arene units; said hot melt composition being substantially homogeneous in the molten phase and being deformable thermoplastic solid which is lubricitous and generally tack-free at the surfaces at temperatures below 65° C.; said hot melt composition being flowable at temperatures below 320° C.

2. A hot melt composition according to claim 1 wherein said rubbery block co-polymer is a three block A-B-A co-polymer with the structure:
polystyrene-poly(ethylene-butylene)-polystyrene.

3. A hot melt composition according to claim 2 wherein said wax is a paraffin wax, said liquid silicone is dimethylpolysiloxane, and said vinyl arene units of said resinous thermoplastic polymer are methylstyrene units.

4. A hot melt composition according to claim 3 wherein said composition contains about 5-30% by weight of said component (e).

5. A hot melt composition according to claim 1 consisting essentially of:
 about 20% by weight of a paraffin wax with a melting point above 150° F.;
 about 10% by weight of a rubbery three block co-polymer with terminal polystyrene blocks and a central, rubbery poly(ethylene-butylene) block;
 about 40% by weight of a hydrocarbon oil consisting essentially of a blend of naphthenic and paraffinic hydrocarbons and an aromatic content not exceeding about 5% by weight;
 about 5% by weight of a liquid dimethylpolysiloxane; and
 about 25% by weight of a vinyltoluene-alphamethylstyrene co-polymer having a ring and ball softening point within the range of about 70° to about 120° C.

* * * * *

UNITED STATES PATENT AND TRADEMARK OFFICE
CERTIFICATE OF CORRECTION

PATENT NO. : 4,032,492
DATED : February 10, 1977
INVENTOR(S) : Paul A. Englund, James A. Collins It is certified that error appears in the above-identified patent and that said Letters Patent are hereby corrected as shown below:

```
Patent Date Incorrect - Listed as July 5, 1977
            Correct date  -- June 28, 1977 --

In column 1, line 35, macroseal should be in quotes
In column 2, line 53, homogeneous should be in quotes
In column 4, line 27, chatter should be in quotes
In column 5, line 30, alpha   should be underlined
In column 7, line 23, "is" should be --in--.
In column 7, line 55, alpha should be underlined
In column 10,line 17, PICCOTEX should be in quotes
" "          "     "  PICCOLASTIC should be in quotes
```

Signed and Sealed this

*Eighth* Day *of November 1977*

[SEAL]

Attest:

RUTH C. MASON
*Attesting Officer*

LUTRELLE F. PARKER
*Acting Commissioner of Patents and Trademarks*